US008209301B2

(12) United States Patent
Bordawekar et al.

(10) Patent No.: US 8,209,301 B2
(45) Date of Patent: *Jun. 26, 2012

(54) METHOD AND SYSTEM FOR DETECTION OF INTEGRITY CONSTRAINT VIOLATIONS

(75) Inventors: Rajesh Bordawekar, Yorktown Heights, NY (US); Michael George Burke, Yonkers, NY (US); Mukund Raghavachari, Baldwin Place, NY (US); Oded Shmueli, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 1238 days.

This patent is subject to a terminal disclaimer.

(21) Appl. No.: 11/932,492

(22) Filed: Oct. 31, 2007

(65) Prior Publication Data

US 2008/0059841 A1    Mar. 6, 2008

Related U.S. Application Data

(63) Continuation of application No. 10/627,982, filed on Jul. 28, 2003, now Pat. No. 7,519,952.

(51) Int. Cl.
*G06F 7/00* (2006.01)

(52) U.S. Cl. .................... 707/690; 707/808

(58) Field of Classification Search .................... None
See application file for complete search history.

(56) References Cited

U.S. PATENT DOCUMENTS

| 4,888,690 | A | | 12/1989 | Huber | |
|---|---|---|---|---|---|
| 5,386,557 | A | * | 1/1995 | Boykin et al. | 1/1 |
| 5,423,023 | A | * | 6/1995 | Batch et al. | 717/117 |
| 5,488,722 | A | * | 1/1996 | Potok | 717/106 |
| 5,513,350 | A | * | 4/1996 | Griffin et al. | 717/106 |
| 5,551,029 | A | * | 8/1996 | Jagadish et al. | 1/1 |
| 5,748,878 | A | | 5/1998 | Rees et al. | |
| 5,878,434 | A | * | 3/1999 | Draper et al. | 1/1 |
| 5,963,939 | A | | 10/1999 | McCann et al. | |
| 6,065,017 | A | * | 5/2000 | Barker | 1/1 |
| 6,106,575 | A | | 8/2000 | Hardwick | |
| 6,138,112 | A | | 10/2000 | Slutz | |
| 6,141,699 | A | | 10/2000 | Luzzi et al. | |
| 6,161,200 | A | | 12/2000 | Rees et al. | |
| 6,289,392 | B1 | | 9/2001 | Bugbee | |
| 6,311,327 | B1 | | 10/2001 | O'Brien et al. | |
| 6,446,087 | B1 | * | 9/2002 | Lai | 707/687 |
| 6,539,539 | B1 | | 3/2003 | Larsen et al. | |
| 6,581,062 | B1 | | 6/2003 | Draper et al. | |
| 6,640,231 | B1 | * | 10/2003 | Andersen et al. | 1/1 |

(Continued)

OTHER PUBLICATIONS

"A Unified Constraint Model for XML," by Fan et al. In: Computer Networks, vol. 39, Issue 5, Aug. 5, 2002, pp. 489-505. Available at: sciencedirect.com.*

(Continued)

*Primary Examiner* — Neveen Abel Jalil
*Assistant Examiner* — Daniel Kinsaul
(74) *Attorney, Agent, or Firm* — McGinn Intellectual Property Law Group, PLLC

(57) ABSTRACT

A system (and method) of detecting an error in a database interaction, includes providing information about at least one of at least first and second software systems, and a mapping between at least a portion of the at least first and second software systems, and examining the at least one of the first and second software systems and the mapping to determine an error in an interaction between the at least first and second software systems.

23 Claims, 7 Drawing Sheets

U.S. PATENT DOCUMENTS

| | | | |
|---|---|---|---|
| 6,654,953 | B1 | 11/2003 | Beaumont et al. |
| 6,658,651 | B2 | 12/2003 | O'Brien et al. |
| 6,681,383 | B1 | 1/2004 | Pastor et al. |
| 6,704,747 | B1 * | 3/2004 | Fong ................................. 1/1 |
| 6,760,903 | B1 | 7/2004 | Morshed et al. |
| 6,810,429 | B1 | 10/2004 | Walsh et al. |
| 6,934,712 | B2 | 8/2005 | Kiernan et al. |
| 6,947,945 | B1 | 9/2005 | Carey et al. |
| 7,016,966 | B1 | 3/2006 | Saulpaugh et al. |
| 7,031,956 | B1 * | 4/2006 | Lee et al. ........................... 1/1 |
| 7,043,549 | B2 | 5/2006 | Breese et al. |
| 7,096,224 | B2 | 8/2006 | Murthy et al. |
| 7,100,152 | B1 | 8/2006 | Birum et al. |
| 7,107,579 | B2 | 9/2006 | Tsai et al. |
| 7,124,402 | B2 | 10/2006 | Chamberlain |
| 2002/0091702 | A1 * | 7/2002 | Mullins ........................ 707/100 |
| 2002/0169788 | A1 * | 11/2002 | Lee et al. .................... 707/104.1 |
| 2003/0084073 | A1 * | 5/2003 | Hotti et al. .................... 707/201 |
| 2003/0120665 | A1 * | 6/2003 | Fox et al. ....................... 707/100 |
| 2004/0034651 | A1 * | 2/2004 | Gupta et al. .................. 707/102 |
| 2004/0073565 | A1 * | 4/2004 | Kaufman et al. ............. 707/101 |
| 2004/0139095 | A1 * | 7/2004 | Trastour et al. ............... 707/100 |
| 2004/0205179 | A1 * | 10/2004 | Hunt et al. .................... 709/223 |

OTHER PUBLICATIONS

"Specifying and Implementing the Operational Use of Constraints in Object-Oriented Applications," by Verheecke and Van Der Straeten. In: CRPIT '02 Proceedings of the Fortieth International Conference on Tools (2002). Available at: ACM.*

"Using UML/OCL Constraints for Relational Database Design," by Demuth and Hussmann. In: Lecture Notes in Computer Science, 1999, vol. 1723/1999, 751. Available at: SpringerLink.*

"Integrity Merging in an Object-Oriented Federated Database Environment," by Alzahrani et al. In: Lecture Notes in Computer Science, 1995, vol. 940/1995, 226-248. Available at: SpringerLink.*

"Schema Integration with Integrity Constraints," by Conrad et al. In: Lecture Notes in Computer Science, 1997, vol. 1271/1997, 200-214. Available at: SpringerLink.*

"Enterprise Application Integration with XML and JAVA", JP Morgenthal, et al., Jul. 31, 2000, pp. 95-111.

"A Mapping Schema and Interface for the XML Stores", Sihem Amer-Yahia, et al., ACM, pp. 23-30, Nov. 2002.

"UML and XML Schema", Nicholas Routledge, et al., ACM, pp. 157-166, Jan. 2002.

Template Software SNAP Foundation Template Using the SNAP Development Environment (SNAP), whole manual, copyright 1998, released 1997.

Template Software SNAP Foundation Template Using the SNAP Permanent Storage Component (PERM), whole manufal, copyright 1998, released 1997.

Template Software SNAP Foundation Template Using the SNAP Communication Component (COM), whole manual, copyright 1998, released 1997.

Template Software Web Component, Using the WEB Component (WEB), whole manual, copyright 1997, released 1997.

Template Software Foundation Template SNAP Application Developer's Training Course (TRAINS), Module 8, 1997.

Philip A. Bernstein, et al., "Fast Methods for Testing Quantified Relational Calculus Assertions", Association for Computing Machinery, ACM 0-89791-073-7/82/006/0039, 1982, pp. 39-50.

Paul Grefen, et al., "Integrity Constraint Checking in Federated Databases", IEEE, 0-8186-7505-5/96, May 1996, pp. 38-47.

Achim D. Brucker, et al., "Checking OCL Constraints in Disributed Component Based Systems", IBM Corporation Technical Report 157, Jul. 2001, 46 pages.

"Object Constraint Language Specification", OMG—Unified Modeling Language, v1.4, Sep. 2001, pp. 6-1 to 6-50.

* cited by examiner

EMPLOYEE

| NAME | DEPT | MGRID | SALARY | BONUS |
|------|------|-------|--------|-------|

(C1) NAME ≠ NULL
(C2) DEPT = "US*"
(C3) BONUS ≤ 0.4 × SALARY
(C4) FOREIGN KEY (DEPT, MGRID)
   REFRENCES MANAGER (DEPT, MGRID)
(C5) (DEPT = "USSales") ⇒ SALARY ≤ MGR
   (DEPT, MGRID).SALARY

EMPLOYEE

| NAME | DEPT | MGRID | SALARY |
|------|------|-------|--------|

(C6) NAME ≠ NULL
(C7) DEPT = "US*"
(C8) 500 ≤ MGRID ≤ 999
(C9) 100000 ≤ SALARY ≤ 200000

FIG.1

```
DISCONNECT ALL;
DROP DB FOO1;
CREATE DB FOO1;
CONNECT TO FOO1;

CREATE TABLE ODED.DCODES(
C CHARACTER(1) NOT NULL,
CHECK(
 (C = 'A') OR (C = 'B') OR (C = 'C') OR
 (C = 'D') OR (C = 'E')),
PRIMARY KEY (C)
);

CREATE TABLE ODED.CUSTOMER(
CUSTOMERID BIGINT NOT NULL,
NAME CHARACTER(20) NOT NULL,
CHECK (
 ( (CUSTOMERID >= 100000) AND
 (CUSTOMERID <= 200000)) OR (
 (CUSTOMERID >=20000000) AND
 (CUSTOMERID <= 40000000) ) ),
PRIMARY KEY (CUSTOMERID) );

ALTER TABLE ODED.CUSTOMER DATA
CAPTURE CHANGES NOT VOLATILE;

CREATE TABLE ODED.DISCOUNT(
DISCOUNTCODE CHARACTER(1) NOT NULL,
PERCENT INTEGER NOT NULL,
DELAY INTEGER NOT NULL,
CUSTID BIGINT NOT NULL,
-- CHECK (
-- (AMOUNT > 1) AND (AMOUNT <= 100000) ),
-- CHECK ( (ORDERNUM >= 0) AND (ORDERNUM
<= 10000000)),
CHECK(
 ( (1 <= DELAY) AND (DELAY <=7) ) OR ( (10
<= DELAY) AND (DELAY <= 30) ) OR ( (45 <=
DELAY) AND (DELAY <= 60) ) ),
CHECK(PERCENT in (5, 10, 15) OR ( (20
<= PERCENT) AND (PERCENT <= 30) ) ),
CHECK(DISCOUNTCODE in ('A',
'B', 'C', 'D', 'E') ),
PRIMARY KEY (CUSTID, DISCOUNTCODE),
FOREIGN KEY (CUSTID) REFERENCES
ODED.CUSTOMER (CUSTOMERID) ON DELETE
CASCADE,
```

```
FOREIGN KEY (DISCOUNTCODE)
REFERENCES
ODED.DCODES (C)
);

ALTER TABLE ODED.DISCOUNT DATA
CAPTURE CHANGES NOT VOLATILE ;

CREATE TABLE ODED.INVENTORY(
ITEMNUMBER CHARACTER(8) NOT NULL,
AMTINSTOCK INTEGER NOT NULL,
CATEGORY VARCHAR(20) NOT NULL,
CHECK (
 (AMTINSTOCK >= 0) AND (AMTINSTOCK
<= 10000) ),
CHECK (
 ( ( ITEMNUMBER Like 'EU%') AND
 ( ITEMNUMBER > 'EU000000') AND
 ( ITEMNUMBER < 'EU999999') ) OR
 ( ( ITEMNUMBER Like 'US%') AND
 ( ITEMNUMBER > 'US000000') AND
 ( ITEMNUMBER < 'US999999') ) OR
 ( ( ITEMNUMBER Like 'WL%') AND
 ( ITEMNUMBER > 'WL000000') AND
 ( ITEMNUMBER , 'WL999999') )
),
PRIMARY KEY (ITEMNUMBER) );

ALTER TABLE ODED.INVENTORY DATA
CAPTURE CHANGES NOT VOLATILE;

CREATE TABLE
ODED.CUSTOMERCATEGORIES
CUSTOMERID BIGINT NOT NULL,
CATEGORY VARCHAR(20) NOT NULL,
-- CHECK (
-- (AMTINSTOCK >= 0) AND (AMTINSTOCK
<= 10000) ),
PRIMARY KEY (CUSTOMERID, CATEGORY),
FOREIGN KEY (CUSTOMERID) REFERENCES
ODED.CUSTOMER (CUSTOMERID) ON DELETE
CASCADE
);

ALTER TABLE ODED.INVENTORY DATA
CAPTURE CHANGES NOT VOLATILE ;

CREATE TABLE ODED.ORDER (
ORDERNUM BIGINT NOT NULL,
CUSTID BIGINT NOT NULL,
AMOUNT DECIMAL NOT NULL,
TAX DECIMAL NOT NULL,
DISCOUNTCODE CHARACTER(1) NOT NULL
```

FIG.6A

```
CHECK ( (AMOUNT > 1) AND (AMOUNT <=
100000) ),
CHECK ( (ORDERNUM >= 0) AND (ORDERNUM <=
10000000) ),
CHECK ( (TAX <= .4 * AMOUNT) AND ( (TAX =
25) OR (TAX = 50) OR (TAX >= 100) ) ),
PRIMARY KEY (ORDERNUM),
FOREIGN KEY (CUSTID) REFERENCES
ODED.CUSTOMER (CUSTOMERID) ON DELETE
CASCADE,
FOREIGN KEY (DISCOUNTCODE) REFERENCES
ODED.DCODES (C)
);

ALTER TABLE ODED.ORDER DATA CAPTURE
CHANGES NOT VOLATILE;

CREATE TABLE ODED.ORDERDETAILS(
ORDERNUM BIGINT NOT NULL,
ITEM# CHARACTER(8) NOT NULL,
NOITEMSREQUESTED INTEGER NOT NULL,
NOITEMSSHIPPED INTEGER NOT NULL,
NOITEMSRECEIVED INTEGER NOT NULL,
CHECK ( (NOITEMSREQUESTED > 0) AND
(NOITEMSREQUESTED < 101) ),
CHECK (NOITEMSRECEIVED <=
NOITEMSSHIPPED),
CHECK(NOITEMSSHIPPED <=
NOITEMSREQUESTED),
PRIMARY KEY (ORDERNUM, ITEM#),
FOREIGN KEY (ITEM#) REFERENCES
ODED.INVENTORY (ITEMNUMBER) ON DELETE
CASCADE,
FOREIGN KEY (ORDERNUM) REFERENCES
ODED.ORDER (ORDERNUM) ON DELETE CASCADE
);

ALTER TABLE ODED.ORDERDETAILS DATA
CAPTURE CHANGES NOT VOLATILE;

CREATE TRIGGER CatTrigger
    AFTER INSERT ON
ODED.CUSTOMERCATEGORIES
    REFERENCING NEW AS xxx
    FOR EACH ROW MODE DB2SQL
    WHEN (NOT EXISTS
     (SELECT * FROM ODED.INVENTORY
      WHERE
xxx.CATEGORY=ODED.INVENTORY.CATEGORY
      ) )
            SIGNAL SQLSTATE '7599
('Cannot insert category field ')

CREATE TRIGGER InvTrig1
    AFTER DELETE ON ODED.INVENT
    REFERENCING OLD AS xxx
    FOR EACH ROW MODE DB2SQL
    WHEN (EXISTS
     (SELECT * FROM
ODED.CUSTOMERCATEGORIES
      WHERE
xxx.CATEGORY=ODED.CUSTOMERCATEGORIES.
CATEGORY
      ) )
            SIGNAL SQLSTATE '7600
('Cannot delete referenced category field ')

insert into ODED.INVENTORY
values ('EU123456', 10, 'grinders')
```

FIG.6B

METHOD AND SYSTEM FOR DETECTION OF INTEGRITY CONSTRAINT VIOLATIONS

The present application is a Continuation Application of U.S. patent application Ser. No. 10/627,982, filed Jul. 28, 2003 now U.S. Pat. No. 7,519,952.

BACKGROUND OF THE INVENTION

1. Field of the Invention

The present invention generally relates to error detection when heterogeneous software systems share common data, and more particularly, to a method and system for early detection of integrity constraint violations in application-database interactions.

2. Description of the Related Art

Many large-scale software applications, such as payroll systems, online stores and other web sites, travel applications, etc., involve interactions between applications and databases, where the application accesses a database (DB). Current application programming frameworks, such as the Java® 2 Enterprise Edition (J2EE) (See http://www.javasoft.com/j2ee), allow an application developer to specify a mapping between database tables and application object classes (as in object-oriented programming), from which objects are generated automatically at application runtime The objects generated from a given mapping between application object classes and database table are simply proxies (e.g., windows or surrogates) into the actual data in the database. The idea is that the programmer gets an easy way to program against the DB, using notions and facilities more intuitive to a programmer (e.g., such as objects). Thus, the programmers do not have to worry about writing low-level database access code, for example, using JDBC. The underlying system uses the mapping provided by the developer between application object classes and database tables to manage interactions between the application and the database automatically.

A problem with current application programming frameworks is that databases in general have notions of integrity constraints on tables, whereas application object classes typically do not have a corresponding notion. When window/proxy objects are created from data in the database based on the mapping provided by a programmer, then such objects typically do not contain information about the integrity constraints on the data in the database. Once the application has finished working with the object view of the database, and attempts to update the database with the data in the object view, an error may arise if the data do not satisfy the database system's constraints. To summarize, when the underlying system created this object view, these DB constraints have been forgotten and only when the data is to be placed again in the DB does the error arise. This error may result in much loss of work and data by the application.

First, background on database integrity constraints is provided below. Database integrity constraints are application-independent assertions about the database content and its allowed transformations. Data types can be thought of as elementary constraints that limit the set of allowed content values. Similarly, a NOT NULL constraint states that NULL is not among the allowed values.

Primary key and unique constraints assert that the value combinations associated with the mentioned columns are unique within a relation. Check constraints are associated with a relation (e.g., the checked relation). Check constraints allow more elaborate verification at the tuple-level. Check constraints are usually intra-relational (e.g., refer to the value in a certain column or relates values in different columns of a tuple). In SQL 99 [Peter Gulutzan and Trudy Pelzer, "SQL 99 Complete—Really," CMP Books 1999] relationships to arbitrary other tables are allowed. Assertions can be thought upon as stand-alone check constraints usually referring to more than one table. Assertions also apply at the table rather than the tuple level.

Foreign keys are columns in one relation that refer to columns in another parent relation such that the columns combination at the parent is declared as either unique or a primary key. In specifying a foreign key, the database designer has the option of specifying what happens if a parent relation tuple is deleted (or updated) while being pointed to by foreign key references from other relations. The basic options are to block the deletion, to cascade it (e.g., to delete or update the pointing tuples), to set the pointing columns to NULL, or to set them to a default value.

For example, as shown in FIG. 1, some constraints might include that each employee must have a manager, if the employee is in the dept "USSales", her salary should be less than her manager's, a manager's salary must be within a certain range, etc. Typically, these types of constraints cannot be expressed easily in a programming language. Specifically, consider an application class, Employee, with fields {NAME, DEPT, MGRID, SALARY} that are mapped to the corresponding columns of the EMPLOYEE relation. In current application frameworks, a constraint such as the constraint C5 of FIG. 1 on the database is not generally manifest in the declaration of a class Employee in a programming language. The programmer must write explicit code to ensure that instances of the Employee object do not violate that constraint.

Since current application frameworks offer little support for handling database integrity constraints at the application-level, a programmer must explicitly ensure that an application will not cause integrity constraint violations. This is generally done by inserting explicit checks by hand into the application code to enforce these constraints. If the database integrity constraints were to change over time, then the application code would also have to be modified to reflect the new integrity constraints. Finding all places where these checks had been inserted by hand is an error-prone and time-consuming process.

Thus, it has been difficult to ensure the database's integrity constraints are manifest in the application classes to which the database is mapped. Following the example above, when the application creates an employee, it may do so without a manager or the salary field might not be in the appropriate range. Significant work may be lost when eventually the application interacts with the database to insert the data corresponding to the Employee object into the database and the database signals an integrity violation error.

Thus, prior to the invention, there has been no technique which would consider the database integrity constraints and the mapping between database tables and application classes to ensure that the application will not cause database integrity constraint violations. Hence, there have been drawbacks in application development and performance.

SUMMARY OF THE INVENTION

In view of the foregoing and other problems, drawbacks, and disadvantages of the conventional methods and structures, a feature of the present invention is to provide a method and structure in which checks are inserted automatically in application code to detect violations in application-database interactions in the application code.

In a first exemplary aspect of the present invention, a system and method for detecting an error in an interaction between a plurality of software systems, includes providing information about at least one of at least first and second software systems, and a mapping between at least a portion of the at least first and second software systems, and examining the at least one of said first and second software systems and said mapping to determine an error in an interaction between the at least first and second software systems.

In a second exemplary aspect of the present invention, a system and method of detecting an error in an application-database interaction, includes examining a database for database constraints, analyzing a mapping between the database and an application, and examining application code to determine a potential or definite error in an application-database interaction.

In a third exemplary aspect of the present invention, a system and method of detecting an integrity constraint violation in a database interaction, includes examining a database schema, examining an application class, and analyzing a mapping between the database schema and the application class, to determine a potential or definite integrity constraint violation in an application-database interaction.

In a fourth exemplary aspect of the present invention, a method of constructing a program, includes detecting in portions of said application code that will or may raise a database integrity constraint violation during an application-database interaction during runtime, the detecting including examining database schema, examining application type, and a mapping between the database schema and the application type, inserting an integrity check notifying the programmer of such a definite or potential violation, and completing the program.

With the invention, a system and technique are provided for detection of application-database interactions that will cause an integrity violation in a database (or any other platform), thus allowing the application to take appropriate steps prior to rectify the violation before accessing the database.

More specifically, the inventive system and technique inserts checks automatically in application code to catch violations early. This has advantages in application development and performance.

With the present invention, when the object proxies are generated, both the database's integrity constraints (e.g., "that all employees must have a manager") and the application's own integrity constraints (if any) are used to ensure that the application encodes all of these constraints, such that, when a program creates a new employee object, the application will automatically check whether the employee has a manager or not.

In this regard, the invention provides a common constraint model which can analyze the application constraints and the database constraints, and the mappings between an application and a database, and can automatically generate code in the application to verify the constraints.

The common constraint model is useful in its own right in that there is now a single, comprehensive repository where the programmer can see all of the constraints and things having to do with a particular application (potentially across a plurality of application programs) and the database(s) which may be accessed by such an application, and to determine inconsistencies in this repository.

Again, in contrast to the conventional techniques in which the programmer had to remember such constraints (e.g., the programmer had to take into account all the various constraints in a database while programming), and in essence the programmer had to write application code which performs all checks explicitly, the invention provides a powerful tool to catch errors and violations automatically by looking at the database constraints and the mapping between the database and the application.

Further, to make the conventional techniques more unworkable and complex, in point of fact such constraints may change over time (e.g., two digit values may change to three-digit values, etc.). This makes the programmer's task extremely complex. The invention accounts for and considers such changes.

Thus, the invention checks/analyzes the database's integrity constraints, and the mapping therebetween in a common constraint model. Furthermore, the application may have integrity constraints specified separately on it as well, which can also be analyzed in the common constraint model. The representation of the database constraints, the application constraints and the mapping between the application and the database in the common constraint model is analyzed to generate checks in the application code which automatically enforces the constraints. It is noted that constraint models are well-known, and for simplicity will not be discussed further herein. The novelty lies in representing constraints on the three inputs, the database, the application, and the mapping between the database and the application, in such a constraint model.

Additionally, the invention provides a technique of a "shadow database" (e.g., shadow tables) which makes such checking (and thereby verifying the constraints) at runtime efficient. As such, it is an optimization process.

The present invention considers both relational and XML data. The inventors have demonstrated that in many cases guard code (e.g., essentially simple checking in the application prior to database access) can result in a very significant performance savings. Guard code, via the generation of a exception, also presents opportunities for the application to catch errors and rectify them, thus leading to better and more reliable application code development. The present invention addresses the possibility that static code analysis can simplify or eliminate guard code portions that are redundant.

Furthermore, the invention provides a platform for statically analyzing application code based on the common constraint model representation to identify errors in the application before even running the program. Moreover, the invention provides a mechanism for showing inconsistencies between the application constraints and the database and possibly the mapping between them.

The invention offers many advantages including: (1) identifying problems areas prior to execution and allowing developers to modify their code; (2) identifying problems at runtime which may lead to transaction aborts and/or expensive executions and allowing the application to compensate for these errors. With the invention, detection of an error causes an exception to be thrown which can be handled by the application to fix the problem.

Consider the sample relations and integrity constraints shown in FIG. 1. Let EmployeeEJB be an object class with fields {NAME, DEPT, MGRID, SALARY} that are mapped to the corresponding columns of the EMPLOYEE relation. As an example of dynamic checking, given an instance of EmployeeEJB, one can detect violations of C1 and C2 by inserting dynamic checks of values local to the object at appropriate commit points in the object's execution. As an example of static checking, note that dynamic checks for constraint C1 on objects are equivalent to null pointer checks on Java® object references at the commit points. Standard compiler optimization techniques, such as partial redundancy elimination, can be used to eliminate or simplify these dynamic checks.

For a more complex example, consider an application that sets the DEPT field to "USSales" and the SALARY field to 200,001. Static checking can detect that this set of values will raise an integrity violation of C5. C5 states that if an employee is in the "USSales" department, then the employee's salary must be less than the employee's manager's salary. C9, however, states that a manager's salary cannot be greater than 200,000. This example reveals the importance of examining the interactions among multiple constraints. Though data about MANAGER tuples are not present in the object class, one can infer facts about these tuples that aid in determining violations of integrity constraints. Past work on checking of inequality constraints in optimizing compilers (e.g., for data dependence analysis or array bounds checks) provide a foundation for this level of static checking.

Thus, the present invention provides many advantages and novel features including an architecture designed for analyzing and monitoring database-application interactions and early detection of errors in these interactions, both statically and dynamically.

It is noted that while exemplarily the present invention will be described in terms of Enterprise Java® Beans (EJBs) and databases, other applications would include ADO (Active Data Objects) and JDO (Java® Data Objects). The present invention has obtained a performance improvement of over 100% in experiments with an application server and a database.

BRIEF DESCRIPTION OF THE DRAWINGS

The foregoing and other purposes, aspects and advantages will be better understood from the following detailed description of an exemplary embodiment of the invention with reference to the drawings, in which:

FIG. 1 illustrates a database schema 100 illustrating exemplary database relations and integrity constraints to which the present invention can be applied;

FIG. 6A-6B illustrates examples of relational database integrity constraints;

DETAILED DESCRIPTION OF EXEMPLARY EMBODIMENTS OF THE INVENTION

Figure 2:
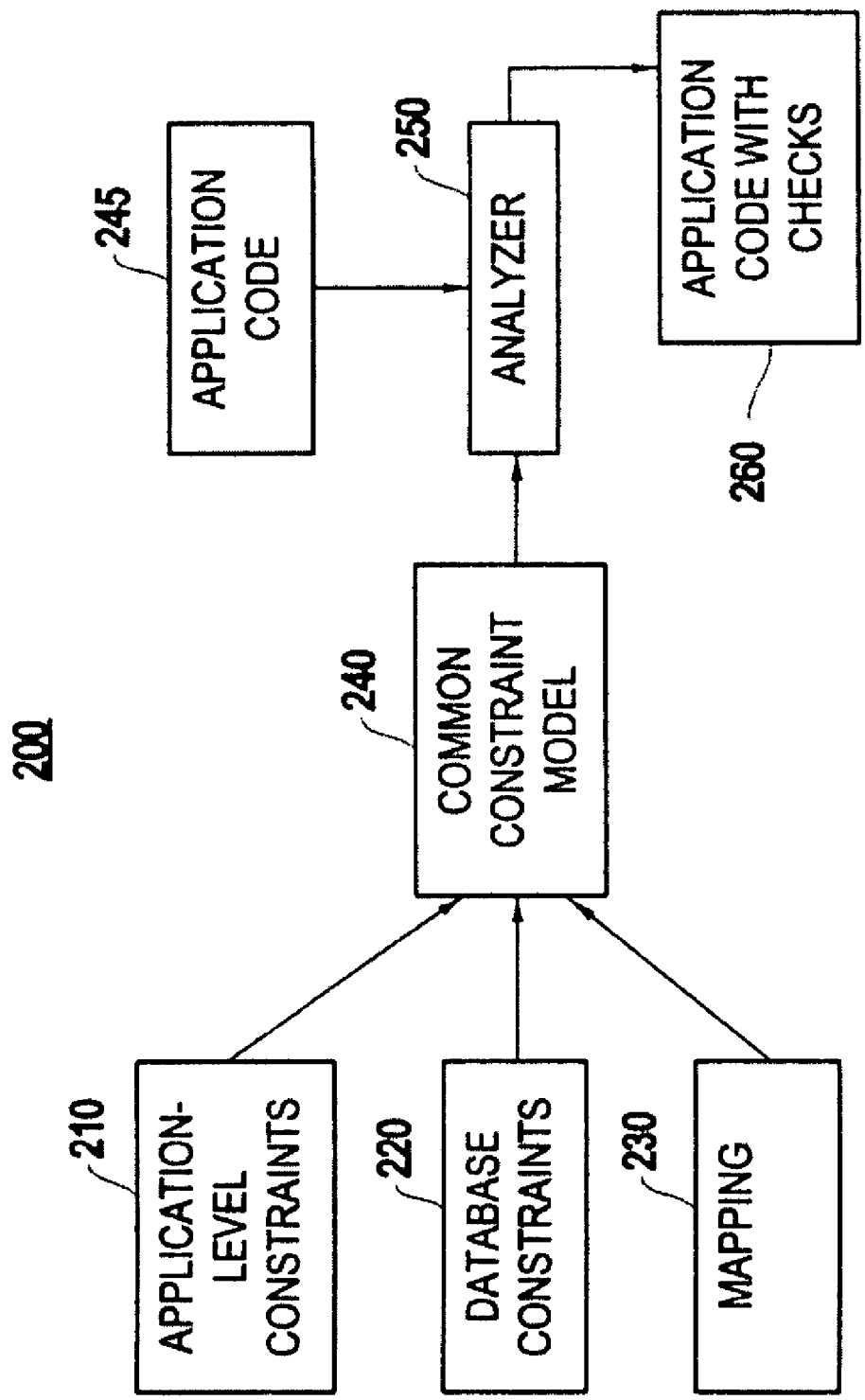
FIG. 2 illustrates a schematic diagram showing a system 200 of the present invention.

Referring now to the drawings, and more particularly to FIGS. 1-8, there are shown exemplary embodiments of the method and structures according to the present invention.

Exemplary Embodiment

Hereinbelow, a language ("constraint formulas") for uniformly expressing integrity constraints originating in various platforms will be described, followed by a detailed look at EJBs performing database reading and writing and examining how checking of a ICV at the application-level can be implemented. Then, a description will be provided of how the invention verifies referential integrity constraints and domain constraints, and finally, the role of static analysis in constraint enforcement will be described and its utility with the present invention.

First, a brief discussion of Enterprise Java® Beans (EJBs), mentioned briefly above, will be provided for the reader's understanding.

Enterprise Java® Beans (EJB) Technology is part of the Java® 2 Enterprise Edition (J2EE) (e.g., see Richard Monson-Haefel, "Enterprise Java®Beans", Third Edition, O'Reilly, 2001; Ed Roman, "Mastering Enterprise Java®Beans", Second Edition, Wiley Computer Publishing, 2002) specification. An EJB is a collection of Java® classes defining a server-side object class conforming to a set of requirements. Instances of an EJB class are objects (e.g., encapsulating data and methods) that reside on the server-side and are accessed, possibly remotely, from a client-side. These instances may be viewed as tasks executed by a specialized operating system, called the "Container" in EJB jargon that runs on the server side.

EJBs are a middleware technology for distributed objects. Bean instances, or programming tasks, are executed within a Container system that manages them and also provides a collection of standardized services. In the EJB programming model, entity beans model persistent data. In a deployment, entity beans are mapped into database(s) entities such as tables. Such database tables may be Container-defined or may exist in the database, perhaps serving other applications. The EJB programming model also allows for direct database access via interfaces such as JDBC.

An EJB belongs to exactly one of the following bean types: entity, session or message-driven. The present description is focused on entity beans, which are used mainly to interact with databases. An entity bean instance represents a database-derived entity. It is noted that concurrently and possibly at various Containers, multiple bean instances, representing the same database-derived entity may coexist.

Entity beans come in two types including "Container-Managed Persistence (CMP)" and "Bean-Managed persistence (BMP)." The description shall focus on entity beans that use CMP with the understanding that the techniques described apply to other EJB-database interactions as well. With container-managed persistence, the application developer provides a declarative specification in a file called the deployment descriptor of the mapping from fields of a bean to columns of a relation. A subset of the fields of an entity bean is designated to be the key for the entity bean. The columns in a relation corresponding to these fields must form a key in the relation. Once the key has been set for an entity bean instance, it may not be changed. The developer may also specify Container-Managed Relationships (CMR) between entity bean classes, which imply foreign key constraints between the relations corresponding to the entity beans.

A J2EE-compliant application server processes the declarative specification provided by the developer to generate code that manages database interactions. The Container manages the container-managed relationships, concurrency, loading, and storing of data from the database. A simplified model of EJB-database interactions is now described, which corresponds to common uses of EJBs.

An application may either work with entity bean instances populated with values from the database or create new entity bean instances and insert the corresponding data into the database. Interactions with the database normally occur within the scope of an entity bean transaction, which generally maps directly to a database transaction. All updates to the database are committed (resp., rolled back) when the entity bean transaction commits (resp., rolls back). There are three kinds of interactions of interest:

EJBLoad: An instance of an entity bean is created by loading a tuple from the database.

EJBStore: The tuple in the database with the same key as the entity bean instance is updated with the values of the entity bean. If no such tuple exists, a new tuple is inserted.

EJBRemove: Remove the unique tuple in the database corresponding to the entity bean instance being removed, using a DELETE statement. The tuple is identified by the EJB key.

Database systems have a sophisticated array of integrity enforcement mechanisms such as check constraints, referential integrity constraints and triggers, as briefly mentioned above. The database system maintains these constraints, usually per each SQL statement. This enforcement applies to interactions with applications running as EJBs in the Container.

A problem is that EJBs, which are designed for reusability, may be generic and may be developed without prior full knowledge of the database environment and its intricacies. Even when such knowledge exists, it is generally the application programmer's responsibility to ensure that the EJBs-based application will not be in a state inconsistent with respect to the database's integrity constraints. Otherwise, an integrity constraint violation may occur, which may result in loss of work and data by the application.

EJB applications may include a number of different beans (e.g., definitions and instances), produced by different developers, and accessing relevant data from the same tables and tuples. Since each developer is not necessarily aware of the others, and since there are possibly legacy applications running against the same database, etc., there is a high potential for integrity constraint violations (ICVs). The possibility for such violations exists in more traditional environments as well. However, here it is especially high due to the "Lego nature" of beans as opposed to applications directed at a specific environment.

Ideally, it would be helpful to be able to identify these possible violations prior to execution. This can be achieved to some extent via (static) analysis.

The benefits of such a static analysis include: (1) identifying application store operations to the database that will definitely (or potentially) cause an ICV; and (2) identifying application load operations from the database that will definitely (or potentially) result in Java®-type violations or undesired casting.

The identification of potential or definite integrity constraint violations includes the following main benefits:
(1) preventing a costly database access that will result in an exception and/or a costly abort; (2) generating an exception that would allow the bean to correct its data; and (3) a useful debugging aid.

Turning to FIG. 2, and as described in much further detail below, a system 200 according to the present invention for early integrity constraints checking for application-database interactions is shown.

Specifically, system 200 includes application-level constraints 210, database constraints 220, and a mapping 230 therebetween which are represented in a common constraint model 240. Each of 210, 220 and 230 are in their own languages.

As noted, the notion of a constraint model 240 is not believed to be novel, and specifically such a constraint model 240 is known or can be easily built by one of ordinary skill in the art, for example, using the OCL constraint model. However, the present inventors have defined the constraint model such that it can translate relational database constraints, application-level constraints and the mapping therebetween into a common constraint model. The novel concept is using a constraint model which receives the above-mentioned three inputs. Hence, all that is needed is a constraint model that can be defined, and can place the mapping of database constraints and application level constraints therein.

The common constraint model 240 puts the application constraints 210, database constraints 220, and mapping 230 into a common language, which can then be analyzed. One possible output of this analysis are checks that are inserted into application code. The analyzer 250 takes as input the common constraint model 240 and application code 245. It first checks for inconsistencies between the different constraints. If there are no inconsistencies, then the analyzer 250 checks the application code 245 for potential or definite integrity constraint violations. If it does not find any errors, then it automatically produces the application code checks 260 which verify the constraints.

Figure 3:
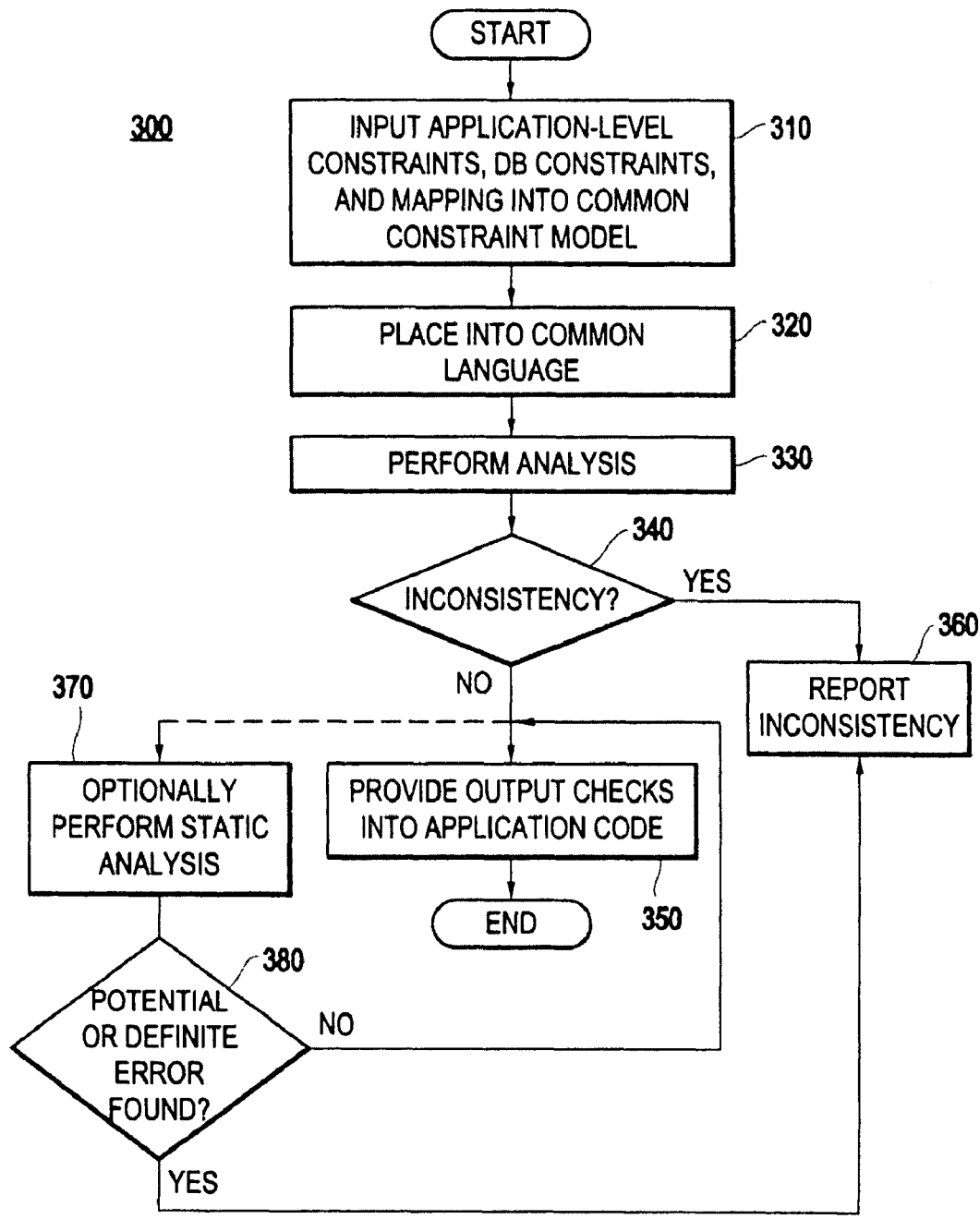
FIG. 3 is a flowchart of a method 300 according to the present invention.

FIG. 3 illustrates a flowchart of the method 300 of early integrity constraints checking for database interactions according to the present invention which correspond to the description above.

Specifically, in steps 310, application-level constraints, database constraints, and a mapping therebetween are input to a common constraint model.

Then, in step 320, the common constraint model places the application constraints, database constraints, and mapping into a common language. In step 330, an analysis is performed on the common language, to generate checks.

In step 340, the constraints in the common constraint model (optionally) are checked for inconsistencies between the different constraints/checks.

If there are no inconsistencies, then in step 350, the model automatically produces (outputs) the application code checks (e.g., guard code, as described in further detail below) which enforce the constraints.

Further, optionally, in step 370 a static analysis may be performed. If a potential or definite error is found in step 380 (e.g., a "YES"), then the inconsistency (error) is reported. By the same token, if a "NO" is found in step 380, then the process proceeds to step 350.

If there are inconsistencies, then in step 360, an error is reported.

Figure 4:
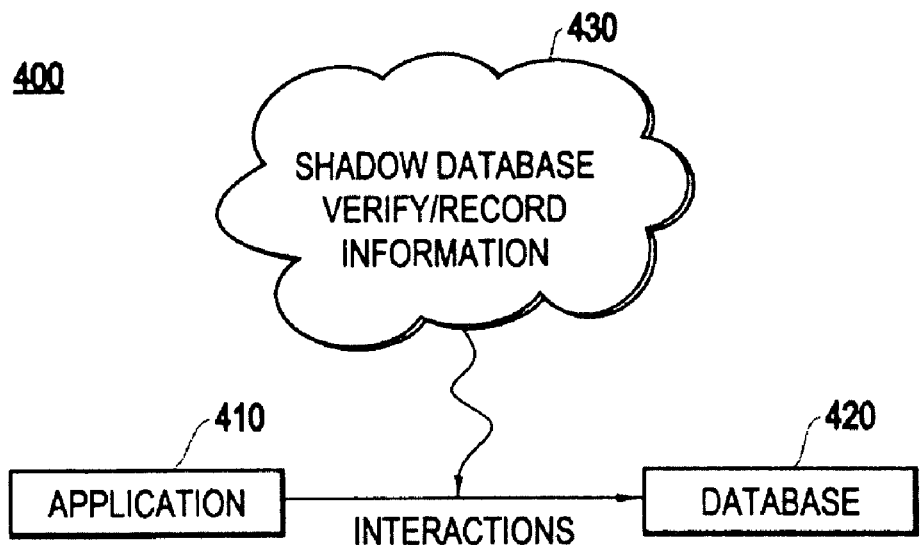
FIG. 4 illustrates a shadow database 430 according to the present invention.
Figure 5:
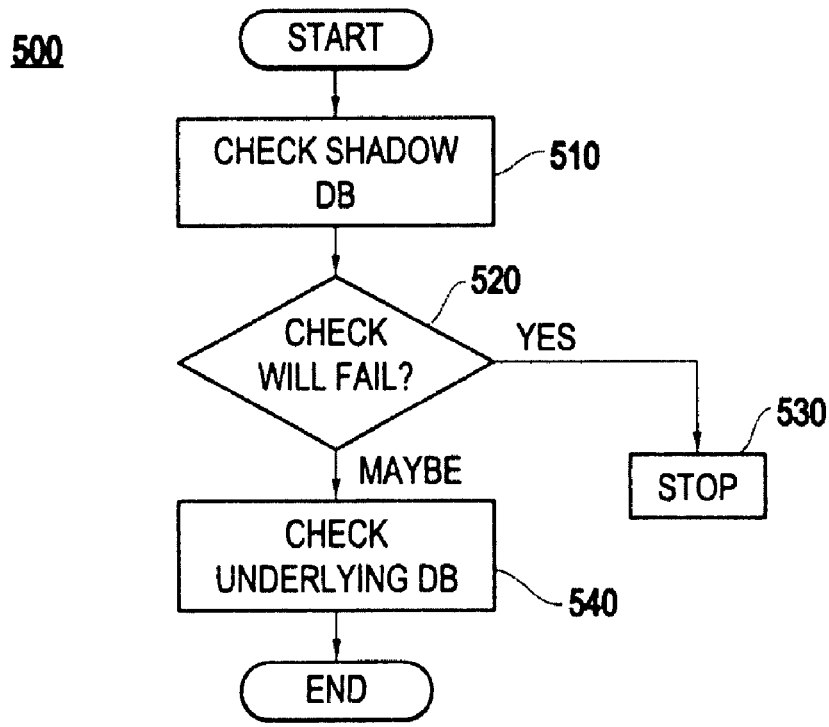
FIG. 5 illustrates a flowchart of a method 500 which employs a shadow database in the application code according to the present invention.

Another aspect of the invention, as shown in FIG. 4 and the flowchart of FIG. 5, and as described in further detail below, an architecture 400 is provided with "shadow tables" (e.g., "shadow databases" 430) for interactions between an application 410 and a database 420.

More specifically, when generating checks that enforce the constraints, an inefficient way of doing so would be to generate a check which accesses the database each time. Thus, each time one would go to the database and retrieve all data necessary to check the application object to ensure correctness with respect to the database constraints. This database access is generally time-consuming.

Thus, the present invention can optimize such a time-consuming database access procedure, by providing and using a "shadow database" (or a "shadow table"), which is a partial view of the database, in the application code itself. Such a shadow database is transparent to the programmer and the application. The shadow database encodes information about values that are known to exist and values that are known not to exist in the database.

The code that is generated first checks the shadow DB (e.g., step 510) to ensure everything is acceptable (e.g., the constraints are acceptable), and only if the shadow database fails to answer appropriately (e.g., hopefully it answers appropriately most of the time) (e.g., a "YES" in step 520), then the process stops in step 530.

Specifically, if the check of the shadow DB returns that the check will fail (that is, a "YES" in Step 530), then it will fail. In contrast, if the shadow DB returns that the check may succeed (or that the check will not fail as in a "MAYBE" in step 530), only then is the underlying DB checked in step 540.

In other words, the shadow DB indicates that if an integrity constraint violation will occur, then there is no need to go to the underlying DB (since it will definitely occur). Conversely, the shadow database is an "approximation" in that if the shadow DB indicates that no integrity constraint violation will occur, then only at that time does the underlying DB need to be checked since an error still could occur.

Again, the shadow DB can only determine the "possibility" of success, since the shadow DB is only a portion (subset) of the underlying DB. Thus, considerable time is saved by such selectively going to the underlying DB (e.g., instead of every time) and finding the existence of some errors earlier. Thus, the approximation process using the shadow DB is extremely efficient.

Specifically, there are two factors which influence the efficiency: how often can one avoid going to the underlying DB, and how expensive is it to go to the DB.

The inventors have performed experiments in which they have found that even if one goes to the underlying DB 99% of the time, that is, the shadow DB says "MAYBE" in these 99% of the cases, the cost of going to the DB for the remaining 1% of the time is still so high, one still saves 20% of time overall by using the shadow DB and avoiding going to the DB the remaining 1% of the time.

In other words, 99% of the time, there is no time savings, whereas in the remaining 1% of the time the time savings is so large that overall the gain is over 20%. Hence, it is best to find the possibility of the error earlier (by using the shadow DB), rather than waiting and accessing the underlying DB each time as again it is relatively "expensive" to go to the underlying DB.

It is noted that the above first exemplary aspect of the invention (e.g., generating checks automatically) can be used stand-alone, or as described above in an optimized manner with use of the "shadow DB". Thus, the notion of the "shadow database" is a corollary of the first exemplary aspect of the invention.

Common Constraint Model

The common constraint model encodes database and application constraints and the mapping between application objects and database relations. The representation has been designed to be amenable to analysis by a constraint solver. The common constraint model encompasses the expression of constraints, the expansion of constraint formulas with respect to other formulas, and the generation of constraint formulas from relational and application-level integrity constraint specifications.

A relation in a database or an EJB class is represented as an entity, $e(X)$, where $X=\{X_1, \ldots, X_n\}$ is an ordered set of variables that correspond to columns in a relation or fields of an EJB. The constraints are illustrated in terms of relations and tuples; the extension to entity beans is straightforward. For each entity, $e(X)$, there is a constraint formula, C, of the form, $e(X)$: (vars, unique, refs, dom), where:

vars: Set of disjoint ordered sets of variables, $\{Y_1, Y_2, \ldots, Y_k\}$.

unique: Set of elements of the form unique (ent, Z, Z'), where ent is an entity, possibly e, $Z' \subset Z$, and $Z \square$ vars $\cup \{X\}$.

refs: Set of elements of the form $\overline{e'(Y)}\hat{\ }$ agree$((X'), (Y'))$, where $X' \subset X, Y' \subset Y, Y \in$ vars.

dom: Quantifier-free first-order predicate logic formula built using type-declarations, string constraints, non-null constraints, and numeric constraints, as will be described.

The set vars contains disjoint sets of variables. The set unique represents declarations of uniqueness constraints on columns of entities. The set, refs, describes referential integrity constraints between entities; such a constraint states that the existence of $e(X)$ implies the existence of $e'(Y)$ with pair-wise equality between $(X')$ and $(Y')$. Finally, dom is a (quantifier-free) first-order predicate logic formula in disjunctive normal form (DNF), built using the logical connectives $\wedge$ and $\vee$.

Given a variable, $Z \in X$ or $Z \in Y, Y \in$ vars, a type declaration is of the form integer(Z), string(Z), float(Z), not-string(Z), not-float(Z), or not-integer(Z). A string constraint is of the form matchstring(Z, expr, [a, b]). where expr is a regular expression. The interval, [a, b], bounds the length of the string. a is an integer constant and b is either an integer constant greater than or equal to a, or infinity (b=infinity implies that the string may be arbitrarily long). For readability, Z=expr denotes matchstring(Z, expr, [0, infinity]) and Z≠expr denotes matchstring(Z, expr', [0, infinity]), where expr' is the complement of expr.

A non-null constraint is of the form $Z \neq$ NULL, where NULL is a distinguished constant. A numeric constraint is an arithmetic relationship operator from $\{<, >, \leq, \geq, =, \neq\}$ relating two expressions built using $\{+, -, *, /\}$, variables from X or $Y \in$ vars, and integer and float constants.

For example, consider the sample relations of FIG. 1. Let $X=\{X_1, \ldots, X_5\}$ and $Y=\{Y_1, \ldots, Y_4\}$. The constraint formulas for the two entities, EMPLOYEE, and MANAGER are:

EMPLOYEE(X):
vars: $\{Y\}$
   unique:
   refs: $\{\overline{MANAGER(Y)} \wedge$ agree$((X_2, X_3), (Y_2, Y_3))\}$
   dom: string$(X_1) \wedge$ string$(X_2) \wedge$ integer$(X_3) \wedge$ integer$(X_4) \wedge$
      integer$(X_5) \wedge (X_1 \neq$ NULL$) \wedge (X_2$="US*"$) \wedge (X_5 \leq 0.4 \times X_4) \wedge (X_2 \neq$"USSales"$\vee (X_4 \leq Y_4))$ MANAGER(Y):
vars:
   unique: $\{$unique(MANAGER, Y, $\{Y_2, Y_3\})\}$
   refs:
   dom: string$(Y_1) \wedge$ string$(Y_2) \wedge$ integer$(Y_3) \wedge$ integer$(Y_4) \wedge$
      $(Y_1 \neq$NULL$) \wedge (Y_2$="US*"$) \wedge (Y_3 \geq 500) \wedge (Y_3 \leq 999) \wedge$
      $(Y_4 \geq 100000) \wedge (Y_4 \leq 200000)$ Constraint formulas may contain references to entities that have constraint formulas themselves, with the chain of references perhaps being recursive. It is often useful to expand the constraint formula for an entity. Through expansion, one can examine the interactions among the constraints of different entities. Expansion can increase the precision of the checks, as will be illustrated shortly. In case of recursion in the references of constraint formulas, the depth of expansion performed will be bounded. Conceptually, an expanded formula can be viewed as a tree, with edges corresponding to references. The expansion of a formula is then performed in a bottom-up manner (from leaf to root) on the tree. Let C (X): (vars, unique, refs, dom), where $\overline{e'(Y)} \wedge$ agree$((X'), (Y'))) \in$ refs be a constraint formula. If e' has a constraint formula, C':

e'(Z)) (vars', unique', refs', dom'), the expansion of C with respect to C' is the formula:

e(X): (vars ∪ vars' ∪ Z, unique ∪ unique', refs, dom∧ dom'∧ equality constraints)

where equality constraints denotes equality constraints between the variables from Y and the corresponding variables in Z. Assume that either vars, Z and vars' are disjoint, or vars' and C' are renamed appropriately. Note that, in general, C' may itself be an expanded formula. The expression, dom∧ dom' ∧ equality constraints is converted into disjunctive normal form. Formulas are often simplified by propagating equalities implied by the equality constraints and by agree clauses of the formula.

For example, let e be an entity with columns A and B and f an entity with columns C and D. Consider the constraint e({A, B})) ({{C, D}}, ∅, refs, dom), where:

refs: {f(C, D)∧ agree((B), (C))}
dom: integer(A)∧ integer(B)∧ (D>A+2)

Consider an update, A=7, to an instance of entity e. If one considers the feasibility of dom, with respect to setting A=7, one finds that is satisfiable. It is possible that there exists some entity that satisfies f(C, D), where D is greater than 9=7+2.

Let the constraint formula for f be f({M, N}): (∅, {unique (f, {M, N}, {M})}, ∅, dom'), where:

dom': integer(M)∧ integer(N)∧ (N<10)

If one expands the formula for e by factoring in information about f, one gets an expanded formula:

vars: {{C, D}, {M, N}}
unique: {unique(f, {M, N}, M)}
refs: {f(C, D)∧ agree((B), (C))}
dom: integer(A)∧ integer(B)∧ (D>A+2)∧ (C=M)∧ (D=N) ∧ integer(M)∧ integer(N)∧ (N<10)

Propagating the equalities, (C=M) and (D=N), and the equality implied by the agree constraint, (B=C), and removing redundant constraints, one gets a simplified dom formula:

$$\text{integer}(A) \wedge \text{integer}(B) \wedge \text{integer}(D) \wedge (D>A+2) \wedge (D<10)$$

The expression, dom, is no longer satisfiable when A=7. Since D>A+2, D>9. Also, one has the constraint D<10. Therefore, 9<D<10, which is infeasible since D must be an integer. Note that expansion allows us to reason about entities, such as f, without fetching them from the database. Further, if it is possible to statically determine that the value of A computed by a given program is greater than 7, then static checking can be used to determine that the program violates the constraint formula.

The EJB standard supports the specification of referential integrity constraints, which may be encoded within the refs components of formulas in our formalism. There is no mechanism for specifying domain constraints on entity beans corresponding to the dom components of our formulas. The representation presented herein maps closely to a subset of OCL, which is one possible means of specifying application-level constraints. Assume that the deployment descriptor allows specification of domain formulas—the exact syntax for specifying these formulas is omitted.

For each EJB in the deployment descriptor of an application, the mapping between an entity bean and a relation is viewed as a referential integrity constraint. For the EmployeeEJB bean of Example 1, let e(X) represent the corresponding entity with a constraint formula C. The refs component of C will contain a reference EMPLOYEE(Y)∧ agree(X, Y') that represents the mapping of the EmployeeEJB bean to the EMPLOYEE relation of FIG. 1. Similarly, a container-managed relationship between two entity bean classes is treated as a referential integrity constraint between the corresponding entities. The domain constraints specified on a bean translate into the dom component of its formula. For a database schema, with PRIMARY KEY, NOT NULL, and UNIQUE constraints, and CHECK CONSTRAINT statements, one formula is generated in the common constraint model for each entity (i.e., relation) in the schema. PRIMARY KEY statements induce unique and not-null constraints on the appropriate column(s) to be added to the constraint formula. FOREIGN KEY statements cause references to be added to the constraint formula and UNIQUE constraints are added to formulas of referenced entities.

For domain constraints, the formula is rewritten into disjunctive normal form. Given a constraint involving ∧, ∨, and ¬, one can apply DeMorgan's Law to revise arithmetic relations to their complements. For example, (5<X) ∨¬((X= 2)∨(X>3)) is converted to (5<X)∨((X≠2)∧ (X≦3)). The negation of a string constraint, matchstring(X, expr, [a, b]), is defined as all strings that do not satisfy expr or those strings that do satisfy expr whose length does not fall within the interval [a, b].

Database Reading and Writing Scenarios

Hereinbelow are listed some of the possible database/application interactions at which integrity constraints may be monitored and verified. "Guard" code may be added before each such interaction to monitoring to identify interactions that will or may result in an error. This is done to prevent costly, useless accesses, and to prevent expensive aborts. Exceptions are raised once a problem is uncovered. This enables the Java® code to fix the problem, or to gracefully degrade. The following typical (use cases) interactions are identified:

Updating a database record
Deleting a database record
Reading a database record
Reading an XML element/attribute
Reading an XML variable
Writing an XML element
Updating an XML element/attribute
Assisting CMP/BMP
Assisting CMR As many of the problems addressed in these various cases reappear in other cases, the focus shall be the EJBLoad, EJBStore, and EJBRemove interactions described previously. Also, it will be discussed how checking code (e.g., "guard code") is placed in a EJB.

Constraint formulas derived from either application-level specifications, database specifications, or both together are used to generate guard code that executes at specific points during EJB-database interactions. The EJB standard provides natural checking points, at each container-database interaction, for the insertion of guard code. Databases offer the option of verifying data integrity at the execution of each SQL statement, or of deferring integrity constraint checks until transaction commit time. In this embodiment, assume that constraints are checked in immediate mode at each container-database interaction.

For database integrity constraints, the guard code maintains a runtime data structure called the transaction shadow database. The guard code is executed during EJBLoad, EJBStore, and EJBRemove interactions. The EJB standard specifies callback methods in every entity bean that are invoked for each of these interactions. Invocations to generated guard code are inserted in these methods. If the guard code determines that an access is certain to cause an integrity constraint violation in the database, the guard code raises an exception that contains useful information about the source of the error. The application can catch the exception and rectify the error if desired.

Integrity constraints specified at the application-level are checked separately from the database-level integrity constraints whenever a new entity bean instance is created or when the fields of an entity bean instance are updated. In the EJB programming model, each update to a field occurs through the execution of a set method (direct accesses to fields are prohibited).

Guard code is inserted in these "setter" methods to enforce application integrity constraints. To enforce application-level constraints when an application creates a new entity bean instance, either directly or through an EJBLoad operation, guard code is inserted in callback methods specified by the EJB standard.

The mechanisms for referential integrity and domain constraint checking is now described.

Referential Integrity Constraints

In the EJB programming model, it is the container's responsibility to ensure that container-managed relationships are used consistently. Application servers currently enforce these application-level integrity constraints by checking that each operation on a container-managed relationship is consistent. They do not, however, monitor referential integrity constraints that have not been manifest as container-managed relationships.

Database referential integrity and uniqueness constraint violations can be detected during EJB-database interactions. The key data structure underlying the mechanism for application-level verification of referential integrity constraints is the transaction shadow database. The transaction shadow database represents the container's (partial) view of the state of the database with respect to a transaction. The term shadow database shall be used henceforth instead of transaction shadow database with the understanding that the lifetime of a shadow database is a transaction. For each relation R of interest in the database, the shadow database contains a shadow table, shadow(R). Each shadow table contains entries of the form exists($a_1, \ldots, a_k$) and not-exists($a_1, \ldots, a_k$), where the $a_i$, $1 \leq i \leq k$, are either integer, float, or string values, the value NULL, or the distinguished value, '*'. A tuple ($a_1, \ldots, a_k$) matches a tuple ($b_1, \ldots, b_k$) if for all $a_i$, $1 \leq i \leq k$, ($a_i = b_i$) $\vee$ ($a_i =$ *). Observe that match is not a symmetric operator, that is, match(t, s) does not imply match(s, t).

As the container loads and stores data from and to the database within a transaction, it populates the shadow tables with entries. The presence of an entry, exists($a_1, \ldots, a_k$), in a shadow database table implies that a tuple matching ($a_1, \ldots, a_k$) exists in the corresponding relation in the database. Similarly, a tuple not-exists($a_1, \ldots, a_k$) in a shadow database table implies that no tuple matching ($a_1, \ldots, a_k$) exists in the corresponding relation in the database.

The information stored in the shadow database depends on the level of isolation, which may be either repeatable read or serializable (as in Jim Gray and Andreas Reuter, "Transaction Processing," Morgan-Kaufmann publishers). With an isolation level of serializable, one is assured that results of referential integrity checks made on behalf of a transaction's SQL statement remain valid (whether successful or resulting in an error) unless affected by the transaction itself. For example, if a statement fails to insert a tuple t due to a foreign key constraint violation (there is no tuple s corresponding to the key), then a matching tuple will not "spontaneously" appear due to other transaction's actions. With repeatable read, there is no "phantom protection", and therefore, one can only make deductions about data read or updated successfully by the container as such data is locked until the end of the transaction.

Let $t=(t_1, t_2, \ldots, t_n)$ be a tuple over a relation with schema $R(X_1, \ldots, X_n)$. Define $t'=\text{Proj}_Y(t)$, where $Y \subseteq \{X_1, \ldots, X_n\}$ as ($t'_1, t'_2, \ldots, t'_n$), $t'_i=t_i$, if $X_i \in Y$, and * otherwise (note that Proj is not the traditional relational projection operator). Let $U \subseteq \{X_1, \ldots, X_n\}$, be a subset of the columns in R declared as UNIQUE. The insertion of a tuple t into the database will definitely violate a uniqueness constraint if there is an entry, exists(t') in the shadow table corresponding to R, such that match($\text{Proj}_U(t)$, $\text{Proj}_U(t')$). Consider the relations of FIG. 1. Assume that the shadow table corresponding to MANAGER consists of two entries, exists("Joe", "USSales", 501, 100000) and not-exists(*, *, 502, *). If the MANAGERID column is marked UNIQUE, then the insertion of the tuple, ("Sam", "USSales", 501, 150000) into the MANAGER relation will violate the uniqueness integrity constraint.

As another example, consider an entity, e(X), representing a relation, R. Assume its constraint formula contains a reference, e'(Y)$\wedge$ agree((X'), (Y')), where e' represents a relation, R'. The insertion or deletion of a tuple into R will violate a referential integrity constraint if after the insertion or deletion (the precise effects of these actions on the shadow database are detailed later on), there are two entries, exists($t_1$), not-exists($t_2$)$\in$shadow(R'), such that match($\text{Proj}_Y(t_2)$, $\text{Proj}_Y(t_1)$). The insertion of a tuple ("Sam", "USSales", 502, 150000, 10000) into the EMPLOYEE relation will raise a referential integrity violation, since it implies the presence of a tuple (*, "USSales", 502, *) in shadow(MANAGER), which also contains the contradicting tuple not-exists(*, *, 502, *).

The shadow database is empty at the beginning of a transaction; it is affected by the execution of each EJB-database interaction. Each entity bean instance, ejb, has a reference, shadow(ejb) to the entry for the tuple from which it was populated. Furthermore, each entry, ent, in the shadow table of the form exists(t), has a reference ejb(ent) to the entity bean instance that it populated (for simplicity, assume there is at most one such reference). Under certain circumstances, these references may be NULL, as described below. First how the shadow database is maintained and used in the absence of cascading actions is examined. Then the mechanism for handling cascading deletes is explained.

EJBLoad(t, R)

When a tuple, t, is loaded from a relation R to populate an instance of an entity bean, ejb, the container stores an entry, ent: exists(t), in the appropriate shadow table. The tuple loaded may be a projection of the tuple of the relation R in the database. The container stores * for those columns of the tuple for which it does not have values. The EJB instance and the newly-created entry are set to refer to each other by setting the references shadow(ejb) and ejb(ent).

EJBRemove(t, R)

Before deleting t from relation R in the database, the shadow database is checked to ensure that referential integrity will not be violated. For each relation R' that has a foreign key reference to R, check shadow(R') to ensure that there is no entry marked exists that refers to the tuple being deleted. If there is no such tuple, the delete operation is forwarded to the database. If the delete operation fails in the database, an appropriate exception is raised. If it succeeds, let T be the subset of columns of R for which the corresponding value in t is not *. For each subset of columns U declared unique such that $U \subset T$, remove each entry, exists(t'), where $\text{Proj}_U(t)=\text{Proj}_U(t')$ holds, from the shadow database relation. not-exists ($\text{Proj}_U(t)$) is inserted into the shadow table. Note that no other transaction and/or application will be able to insert another tuple that matches $Proj_U(t)$. With respect to the current transaction, this tuple will not exist unless it is inserted by the container through an EJBStore operation, as will be described.

There is no necessity of checking for referential integrity violations when an application creates an entity bean and deletes it without saving it into the database. This situation may be distinguished by considering the shadow reference of the EJB instance. If it is empty, the deletion is of an entity bean whose corresponding tuple is not in the database. Otherwise, the deletion is of an existing database tuple.

EJBStore(t, R)

As with the EJBRemove case, there are two situations in which an EJBStore is performed. In the first case, the application has updated an entity bean that has been populated with values from the database. In the second case, the application creates an entity bean instance that is to be inserted into the database. As mentioned, the two situations may be distinguished by using the shadow reference. In both cases, the first two steps are identical. Let T be the subset of columns of R for which the corresponding value in t is not *:

1. For each subset of columns U declared unique for R such that $U \subset T$, check that there does not exist an entry, exists(t') where $\overline{Proj_U(t)} = Proj_U(t0)$.
2. For each set of columns in R that refers to another relation R', the successful insertion of t into R would imply the presence of a tuple t' (which may contain * values) in shadow(R'). Check that the shadow table for R' does not contain not-exists entries that would contradict the existence of tuple t' and entail that the insertion of t will fail.

If the EJBStore operation updates an existing database tuple, $t_{old}$, an additional step is performed that is similar to performing an EJBRemove on a tuple. There must also be no exists entry in a relation that has a foreign key reference to values in columns of $t_{old}$ that are not in t. If any of these checks fail, appropriate exception is raised. Otherwise, the insertion of the tuple into the database is performed. If the database operation succeeds, the new tuple is inserted into the shadow relation, and the shadow and ejb references are set appropriately. All entries not-exists(t"), where match(t", t) are removed. If the operation is updating an existing tuple, for each relevant subset of columns in R, $U \subset T$, that is marked unique and on which $t_{old}$ and t do not agree, not-exists($Proj_U(t_{old})$) are inserted into the table.

Deducing Shadow Tuples

The fact that the database is consistent allows the deduction of the existence of tuples in the database. Consider a tuple, t, from a relation, R, that is read from the database, where R has a foreign key reference to relation R'. The following facts about the database will hold until the end of the transaction:

The current transaction has a lock on t and no other transaction will modify it.

There exists a tuple, $t' \in R'$, to which t refers. No other transaction will be permitted to delete such a tuple since this would violate database integrity.

For every reference of the form $R'(Y) \wedge agree((X'), (Y'))$ in the constraint formula for R(X), an entry exists(t') is inserted into the shadow table R', where the columns corresponding to Y' in t' obtain their values from the appropriate columns in t, and the remaining columns in t' are set to *. Based on R' references, additional tuples may be inserted (this resembles steps in a chase as in Maier, "The Theory of Relational Databases," Computer Science Press). There may already be an entry corresponding to this tuple, which can be determined by searching for an entry, exists(t"), where match(t', t"). In this case, an entry is not added.

A deduced entry does not have an ejb reference to an entity bean instance. On an EJBLoad of a tuple t from R, if there is an entry exists(t') in shadow(R), where match(t', t) and ejb(t')=NULL, exists(t') is replaced by exists(t) and the ejb and shadow references are set appropriately.

Similarly, facts may be deduced from the successful completion of an insert or an update in an EJBStore operation. The success of the operation reveals the existence of tuples that satisfy referential integrity constraints. The shadow database can be updated to reflect this information. The failure of a store operation also provides clues as to the state of the database. If a specific relation can be identified as the cause of the failure, a not-exists entry may be added to reflect this fact. If there is more than one foreign key reference from the inserted tuple and the source of the failure cannot be identified, one only has disjunctive information regarding non-existence, which can be ignored for simplicity. Similar deductions can be made on the success or failure of an EJBRemove operation.

Cascading Actions

Database integrity constraints allow the specification of actions that are executed upon tuple deletion. One must ensure that the effects of these actions are mirrored in the shadow database so that the shadow database remains a faithful view of the database. The handling of a database deletion in the shadow database id described; the treatment of update is similar.

Suppose a tuple t is deleted from the database. One can either simulate the effects of a cascaded delete before performing the deletion in the database, or propagate the effects of a deletion after a successful deletion in the database. This description focuses on the latter case, namely propagating the effects of deletions in the database. In propagating the effects of t's deletion, the following possibilities in the database integrity constraints specification must be handled:

CASCADE: All tuples in the shadow database are deleted that have a foreign key reference to the tuple being deleted. Their deletion may in turn cascade. Because of cascades, the database deletion may cause a "chain reaction" of deletions of tuples from relations for which no information is maintained in the shadow database. These may in turn cause deletions of tuples for which information does exist in the shadow database (possibly rendering such information false). To ensure the accuracy of the shadow database, one must delete all exists entries that could conceivably be involved in the chain of deletions. Taking a conservative approach, if the deletion of a tuple t may cascade to relation R, then all exists entries for relation R are eliminated. This may raise a curious situation, in which an EJB previously loaded by the container has no information concerning it in the shadow database!

SET NULL: The semantics of this operation is to place NULL values in the appropriate columns of tuples referring to the tuple begin deleted. This operation is processed on the shadow database by (1) Performing a sequence of update operations on the shadow database to the referencing exists tuples (that is, setting NULLs or * as necessary), and (2) Performing actions described for EJBRemove on the deleted tuple.

SET DEFAULT: Handled similarly to set NULL.

RESTRICT: If there is a reference to the tuple being deleted in the shadow database, then this deletion will fail at the database and an exception is raised at the application level. So, a successful deletion implies no referencing tuple in the database. This fact may be reflected in the shadow table by adding not-exists entries.

Database triggers may also affect tuple deletion. The treatment of triggers is similar to that of cascaded deletions; a conservative approach is taken and any information that could possibly be affected by triggered actions is invalidated. As triggers may insert and delete tuples, they may affect negative information of the form not-exists as well.

Domain Constraints Code Generation

The shadow information may not always be sufficient to determine constraint satisfaction; for example, data may be missing. In these cases, approximate checks that rely on locally available data are used. Such approximations, while not conclusive, add a degree of assurance that is balanced against the cost of full checks (which are not always possible, for example, in disconnected mode).

Given an entity bean instance of an entity, e(X), with a constraint formula, (vars, unique, vars, dom), assume that the formula has been expanded sufficiently to include interactions with the corresponding relation, and other relations of interest. This expansion may be in some sense an approximation since one cannot expand recursive formulas completely. For dom formulas, an approximation, Approx(dom), will satisfy the statement, dom implies Approx(dom). In other words, unsatisfiability of an approximate constraint guarantees the unsatisfiability of the constraint from which it was derived, but the satisfiability of an approximation provides no such guarantee.

Given a set of clauses, C, observe that $\wedge_{c_i \in C} c_i$ implies $\wedge_{c_j \in C'} c_j$, where $C' \subseteq C$. This implies that discarding clauses from a conjunction of clauses results in a valid approximation. Given a formula in disjunctive normal form, $\vee_{1 \leq i \leq n} C_i$ where each $C_i$ is a conjunction of clauses, one obtains an approximation $\vee_{1 \leq i \leq n} Approx(C_i)$, where each approximation of a $C_i$ discards some of the clauses in $C_i$. Given $C = c_1 \wedge \ldots \wedge C_n$, first discard all clauses that involve type declarations. Two approximations are presented for a given $C_i$, which differ in the precision and runtime cost of the tests:

1. Discard all clauses that use variables from vars. At the end of this process, one has a set of clauses that only use variables from X and constants. These clauses can be checked using only values from an entity bean instance (a local test).
2. Partition the set of clauses $C_i$ into numeric and string constraints. For the numeric constraints, a standard linear/integer constraint solver checks feasibility. String constraints are solved separately. If one discards all clauses in a conjunction, the formula is trivially satisfied. Given an approximate formula in disjunctive normal form, one can generate code that verifies the satisfiability of each of its clauses. If none of these clauses are satisfiable at runtime, an integrity violation exception is raised.

Numeric Constraints:

For an entity, e(X), given a conjunction of numeric constraints, one can derive maximum and minimum values for each of the variables using linear/integer programming. A simpler approach may be used—when a variable participates only in predicates involving relational operators, it is straightforward to derive maximum and minimum values for that variable. Each disjunct in the predicate represents either a collection of intervals, a point, or the empty set. For example, (5<X) represents the interval of values less than 5 (extending to negative infinity), and $((X \neq 2) \wedge (X \leq 3))$ represents the intervals (X<2), (X>2 $\wedge$ X$\leq$3). The minimum and maximum values can be used to detect illegal values efficiently.

If a numeric constraint formula only involves variables from X, one can generate code that evaluates these constraints using values from the entity bean instance at runtime. If the constraint contains other variables, a constraint solver can be used to ensure feasibility. If an entity, e, has a reference to an entity, e', and the constraint formula for e refers to variables from e', one can generate code that checks at runtime:

1. If, for an instance of e, the shadow database contains values for the corresponding instance of e', the constraint is checked using values from the shadow database.
2. Otherwise, the generated code uses the approximation techniques discussed earlier.

String Constraints:

One can generate code that verifies that a string belongs to the language of the expression associated with a constraint. The string length can be checked against the bounds on the constraint to detect violations quickly.

EXAMPLE

For example consider the EMPLOYEE relation in FIG. 1, and an entity bean instance emp with persistent fields {name, dept, mgrid, salary} that correspond to columns in EMPLOYEE. Expand the formula for the entity, emp(X), to include its interactions with the EMPLOYEE relation. After simplification by equality propagation, the expanded constraint formula is (the type checking components of the dom formulas are omitted for readability):

vars: {Y, U}
unique: {unique(MANAGER, U, {$U_2$, $U_3$})}
refs: {EMPLOYEE(Y)$\wedge$ agree(X, Y')}
dom: $(X_1 \neq NULL) \wedge (X_2 = "US*") \wedge (Y_5 \leq 0.4 \times X_4) \wedge (X_2 \leq "USSales" \vee (X_4 \leq U_4))$ where $X = \{X_1, \ldots, X_4\}$, $Y = \{Y_1, \ldots, Y_5\}$, $Y' = \{Y_1, \ldots, Y_4\}$, $U = \{U_1, \ldots, U_4\}$, and the agree clause equates $X_i$ to $Y_i$, $1 \leq i \leq 4$.

In the formula, Y represents the columns of the EMPLOYEE relation, and U represents the columns of the MANAGER relation to which the EMPLOYEE relation refers. One can approximate dom by removing clauses involving variables not local to emp, that is, the clauses involving $Y_5$ and $U_4$. For each remaining clause, code is generated in a straightforward fashion to obtain:

```
boolean checkEmp (String n, String d, int m, int s) {
    if (n = NULL)
        return false // C1: Name must be non-NULL
    if (d[0] !='U' || d[1] !='S')
        return false // C2: Dept must start with "US"
    return true
}
```

As mentioned earlier, one can use static analysis of application code to simplify (or eliminate) the generated checks. For example, if static analysis can establish that n≠NULL, then the above check for (n=NULL) will not be generated.

Continuing the previous example, one can obtain greater precision in checks by a deeper expansion. If the EMPLOYEE entity were expanded first with respect to the MANAGER entity, and then, the emp entity were expanded with respect to the expanded EMPLOYEE formula, one obtains for the dom component (after simplification):

dom: $(X_1 \neq NULL) \wedge (X_2 = "US*") \wedge (Y_5 \leq 0.4 \times X_4) \wedge (X_2 \neq "USSales" \vee (X_4 \leq U_4)) \wedge (U_1 \neq NULL) \wedge (500 \leq X_3) \wedge (X_3 \leq 999) \wedge (100000 \leq U_4) \wedge (U_4 \leq 200000)$ The following lines can be added to checkEmp to increase the precision of our checks:

if (m<500||m>999) return false; This condition is derived from the constraint C8 in FIG. 1.

if (d="USSales" && X4>200000) return false; This condition checks the feasability of X4≦U4 when X2="USSales", given 100000≦U4≦200000 (C9 in FIG. 1).

Even without access to values of the MANAGER relation referred to by the EMPLOYEE relation corresponding to emp, one can determine the feasibility of constraints on the MANAGER relation. In general, a constraint solver may be necessary at runtime to determine the feasibility of the set of constraints. Depending on the level of precision desired, one may choose generate code to invoke a constraint solver at runtime. If a shadow tuple corresponding to the appropriate MANAGER (represented by the set of variables U in the formula) is available, one can use this information to check that if the emp's department is "USSales," the salary of emp is less than the manager's salary.

Placing Guard Code

The placement of guard code is naturally linked to bean transaction management. This is because an important point of enforcing ICs is when the transaction is about to commit. Up to this point, manipulation of information that is destined to be database resident, can be thought of as happening in a cache (although this is not necessarily how most Containers are implemented).

Thus, if one would like to prevent a costly database access that will end in an abort, verification prior to "commit" is desirable. Of course, this does not imply that guard code cannot be used at other times (e.g., by the bean during execution of various business methods, etc.).

The generation and placement of guard code is also tied to the stages in the bean development process. In part to encourage reusability, there is a clear distinction between:

1. Bean development: at this point the target environment is not necessarily known and the bean is developed so as to be usable by multiple applications in various environments;
2. Assembly: various beans from multiple sources and application code are combined into an application. There may still be uncertainties regarding the deployment environment;
3. Deployment: At this point, the bean persistent fields and relationships are tied to a particular database(s) environment; and
4. Operation.

Hereinbelow, assembly and deployment will be mainly addressed. Of course, problems encountered at these stages may necessitate revisiting the development stage (if possible).

Guard code is useful in each of these stages:
1. Development: One exemplary development technique is to generate, semi-automatically, entity beans from a database schema. During development, such a "generic" schema can be used and the guard code may significantly cut development costs. The resulting code is more reliable and efficient.
2. Assembly: Similar benefits can be realized at this stage. Further, as more is known at this stage about the execution environment, more costly problems may be identified.
3. Deployment: Problems that are certain to occur as well as those with a potential of occurring are identified. Based on perceived expected execution, 'cost' reassembly or redevelopment may be undertaken.
4. Operation: Guard code results in fewer costly aborts and a more reliable application.

Finally, while not currently part of the EJB standard, CMIC (Container Managed Integrity Constraints) are foreseen as part of the deployment descriptor. This will enable developers to associate beans with integrity constraints that are declaratively specified rather than explicitly coded. Guard code can implement such CMICs. Further, the framework of the present invention would provide a natural integration enabler for database ICs and CMICs.

One obvious place for guard code is within the container, to be called just prior to processing commit. In this case, code generation is part of the deployment process. This is the recommended option.

Another possibility is placement of the guard code within the bean (e.g., use "empty" methods to be filled). The assembler/deployer generally knows where application work units are done and ICs should hold, and calls the guard code appropriately. In the case of placement of the guard code in the bean, calling is the assembler/deployer's responsibility. Of course, the code may be placed both within the Container and within the bean.

XML

Further considered is the possibility of an XML repository providing a set of services, but not necessarily the usual database services such as concurrency control and recovery. The repository may provide a Checkout/Check in service and versioning. It may require documents to satisfy DTDs and schemas. It may have requirements concerning what documents are allowed to be accessed outside the repository. It may provide update capabilities for parts of documents. Interactions with these repositories may be handled in a manner similar to that described for databases.

Figure 7:
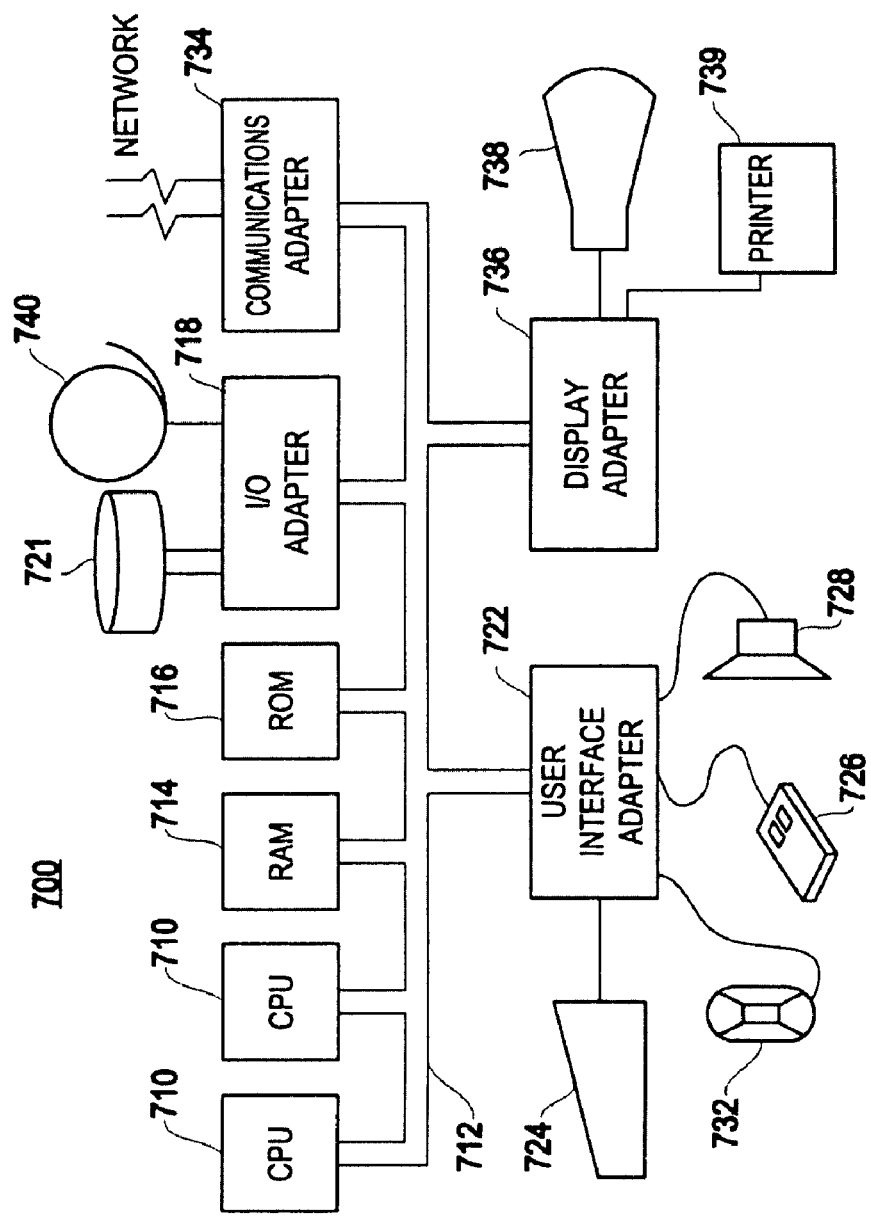
FIG. 7 illustrates an exemplary hardware/information handling system 700 for incorporating the present invention therein.
Figure 8:
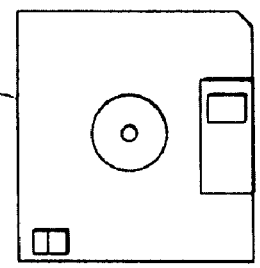
FIG. 8 illustrates a signal bearing medium 800 (e.g., storage medium) for storing steps of a program of a method according to the present invention.

FIG. 7 illustrates a typical hardware configuration 700 of an information handling/computer system for use with the invention and which preferably has at least one processor or central processing unit (CPU) 711.

The CPUs 711 are interconnected via a system bus 712 to a random access memory (RAM) 714, read-only memory (ROM) 716, input/output (I/O) adapter 718 (for connecting peripheral devices such as disk units 821 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 711, as represented by the fast-access storage for example. Alternatively, the instructions may be contained in another signal-bearing media, such as a magnetic data storage diskette 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language.

With the unique and unobvious features of the present invention, the invention represents the application and the database and a mapping therebetween into a common constraint model. The common constraint model is used to analyze the representation of the constraints. Application code may be analyzed statically with respect to the common constraint model to report errors that may or will happen at runtime, and to generate checks in the application code which automatically verifies the constraints. Thus, the invention provides a platform for analyzing (statically and dynamically) a database interaction so as to identify certain, or potential, faults prior to occurrence.

Additionally, the invention provides a technique of a "shadow database" (e.g., shadow tables) which makes such checking (and thereby verifying the constraints) at runtime efficient. As such, it is an optimization process.

While the invention has been described in terms of several exemplary embodiments, those skilled in the art will recognize that the invention can be practiced with modification within the spirit and scope of the appended claims.

Indeed, while the invention has been described with particular utility to application servers (e.g., big enterprise applications which have databases in the background such as E-Bay, Citibank, Travelocity, etc.), the invention certainly is not limited to this specific application and this is merely an exemplary domain, as would clearly be known by one of ordinary skill in the art taking the present application as a whole.

For example, the invention could be useful with any database applications (e.g., payroll, on-line stores, etc.). Indeed, almost every (if not all) large applications work with a database in the back, and would find great utility in the present invention.

Additionally, while EJBs have been discussed above and the results have been described with relation to EJBs, the invention is not limited to EJBs, but indeed any program (e.g., Java® program) which interacts with a database would find the invention beneficial.

Further, while the design above is described with regard to checking the application with respect to the database, a similar mechanism could be provided such the database could be checked with respect to the application, as would be known by one of ordinary skill in the art taking the application as a whole.

Further, it is noted that, Applicant's intent is to encompass equivalents of all claim elements, even if amended later during prosecution.

What is claimed is:

1. A method for detecting an error in an interaction between a plurality of software systems, the method comprising:
   providing information about at least one of at least first and second software systems, and a mapping between at least a portion of said at least first and second software systems;
   automatically generating a check based upon the information and the mapping;
   inserting said check into at least one of said first and second software systems;
   examining said at least one of said first and second software systems and said mapping to determine an error in an interaction between said at least first and second software systems based upon said check; and
   providing a shadow database in one of said at least first and second software systems,
   wherein said shadow database contains partial knowledge of the other of said at least first and second software systems and being used to perform a check, and
   wherein said partial knowledge includes at least one of:
      partial knowledge of data values in said other of said at least first and second software systems; and
      partial knowledge of a non-existence of data values in said other of said at least first and second software systems.

2. The method of claim 1, wherein said information provided about at least one software system of said at least first and second software systems includes at least one of:
   an XML schema of said at least one software system;
   integrity constraints of said at least one software system, said integrity constraints of said at least first and second software systems being represented in a common constraint model;
   a specification of said at least one software system;
   a unified modeling language (UML) model of said at least one software system; and
   a code of said at least one software system.

3. The method of claim 1, wherein said information provided about at least one software system of said at least first and second software systems includes at least one of:
   information about a sub-component of said at least one software system; and
   information about less than an entirety of said at least one software system.

4. The method of claim 1, wherein one of said first and second software systems comprises at least one of a database, an application, an extensible markup language (XML) repository and an XML database, and
   wherein said information provided about said at least one software system of said at least first and second software systems includes at least one of schema information of said database and information about values in said database, and programming language types.

5. The method of claim 1, wherein said mapping is provided one of explicitly and inferred from said information about said at least first and second software systems.

6. The method of claim 1, wherein said error comprises one of an integrity constraint violation, a potential error representing a warning that an error may occur, and a definite error representing one of that an error will occur and that an error has occurred, and
   wherein said error is found prior to said interaction between the at least first and second software systems.

7. The method of claim 1, wherein said error is found at one of during said run time of the at least first and second software systems and prior to any of said interaction between the at least first and second software systems.

8. The method of claim 1, wherein said check is one of:
   inserted at a location directed by a programmer;
   performed after an interaction between said at least first and second software systems;
   performed before an interaction between said at least first and second software systems; and
   performed prior to an end of a transaction.

9. The method of claim 2, further comprising:
   performing a static analysis of said at least first and second software systems to at least one of simplify, eliminate, and approximate said check;
   analyzing said integrity constraints in said common constraint model; and
   if an inconsistency is detected, then outputting an error based on said analyzing.

10. The method of claim 2, further comprising:
modifying said integrity constraints in said common constraint model; and
generating a check from said integrity constraints.

11. The method of claim 1, further comprising reporting said error, wherein said reporting comprises one of:
notifying before running at least one of said at least first and second software systems;
notifying while running at least one of said at least first and second software systems;
allowing said one of said at least first and second software systems to address said error; and
suggesting how said error may be addressed.

12. A method of detecting an error in a database interaction, the method comprising:
examining database code for database constraints;
examining an application code for application-level constraints;
automatically generating a check based upon said database constraints and said application-level constraints;
inserting said check into at least one of said database code and said application code;
analyzing a mapping between said database code and said application code, to determine an error in a database interaction, based upon said check;
after determining said integrity constraint violation and prior to running a program including said application, raising a notification;
at runtime of said program, when an integrity constraint violation is determined to occur, raising a notification; and
analyzing a common constraint model receiving said database schema, application type, and mapping, to determine an inconsistency between said database schema and said application type, wherein if no said inconsistency is determined, then taking all of common constraints and analyzing the application code with respect to the common constraints for an error in the application code, wherein if no said error is determined in the application code, then inserting a check into said application code to enforce the constraints at runtime.

13. The method of claim 12, further comprising generating a check in said application code for enforcing said database and application-level constraints.

14. The method of claim 12, further comprising forming a shadow database in said application code representing a portion of said database.

15. The method of claim 12, wherein said error comprises an integrity constraint violation.

16. The method of claim 12, further comprising:
inputting said database constraints and said application-level constraints, and said mapping into a common constraint model; and
before a program including said application and interacting with said database, is run and after said inputting, performing a static analysis to identify locations of where an error may arise.

17. The method of claim 12, further comprising, after identifying said error and prior to running a program including said application, raising a notification.

18. The method of claim 12, wherein, at a runtime of said program, when an error is detected as occurring, raising a notification.

19. A method of detecting an integrity constraint violation in a database interaction, the method comprising:
examining a database schema;
examining an application type;
automatically generating a check based upon said database schema and said application type;
inserting said check into one of said database schema and said application type;
analyzing a mapping between said database schema and said application type, to determine whether an integrity constraint violation will occur in said database interaction with said application based upon said check;
after determining said integrity constraint violation and prior to running a program including said application, raising a notification;
at runtime of said program, when an integrity constraint violation is determined to occur, raising a notification; and
analyzing a common constraint model receiving said database schema, application type, and mapping, to determine an inconsistency between said database schema and said application type, wherein if no said inconsistency is determined, then taking all of common constraints and analyzing the application code with respect to the common constraints for an error in the application code, wherein if no said error is determined in the application code, then inserting a check into said application code to enforce the constraints at runtime,
wherein said application type includes application code including integrity constraints defined therein, and
wherein said database schema provides each of the integrated constraints defined in the database.

20. The method of claim 19, further comprising:
generating a check in said application code for enforcing said database and application-level constraints; and
forming a shadow database in application code representing a portion of said database.

21. The method of claim 19, further comprising:
inputting said database schema, said application type, and said mapping into a common constraint model; and
before a program including said application and interacting with said database, is run and after said inputting, performing a static analysis to identify locations of where said integrity constraint violation may arise.

22. A system of detecting an error in a database interaction, comprising:
a module for examining, as performed by a processor on a computer, a database code for database constraints;
a module for examining an application code for application-level constraints;
a module for automatically generating a check based upon said database constraints and said application-level constraints;
a module for inserting said check into one of said database code and said application code;
an analyzing unit for analyzing a mapping between said database code and said application code, to determine an error in a database interaction based upon said check;
a module for, after determining said integrity constraint violation and prior to running a program including said application, raising a notification;
a module for, at runtime of said program, when an integrity constraint violation is determined to occur, raising a notification; and
a module for analyzing a common constraint model receiving said database schema, application type, and mapping, to determine an inconsistency between said database schema and said application type, wherein if no said inconsistency is determined, then taking all of common constraints and analyzing the application code with respect to the common constraints for an error in the application code, wherein if no said error is determined in the application code, then inserting a check into said application code to enforce the constraints at runtime.

23. A method for detecting an error in an interaction between a plurality of software systems, the method comprising:
- providing information about at least one of at least first and second software systems, and a mapping between at least a portion of said at least first and second software systems;
- automatically generating a check based upon the information and the mapping;
- inserting said check into at least one of said first and second software systems;
- statically examining said at least one of said first and second software systems and said mapping to determine an error in an interaction between said at least first and second software systems; and
- providing a shadow database in one of said at least first and second software systems,
- wherein said shadow database contains partial knowledge of the other of said at least first and second software systems and being used to perform a check, and
- wherein said partial knowledge includes at least one of:
  - partial knowledge of data values in said other of said at least first and second software systems; and
  - partial knowledge of a non-existence of data values in said other of said at least first and second software systems.

* * * * *